June 30, 1925. 1,544,475
J. A. NOLAN
FEEDER AND SCALE FOR KICKBACK DUMPS
Filed Sept. 30, 1924 2 Sheets-Sheet 2
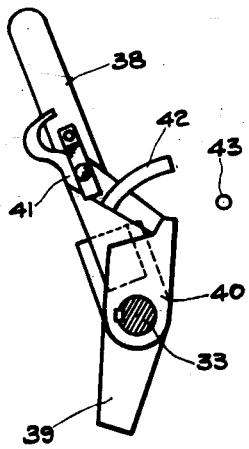
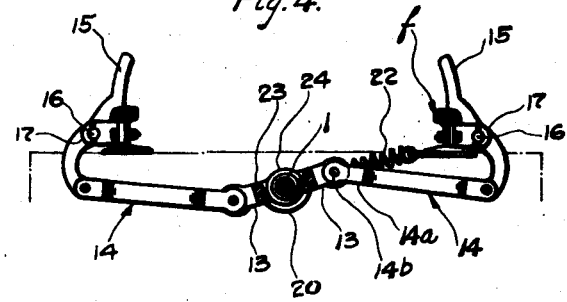
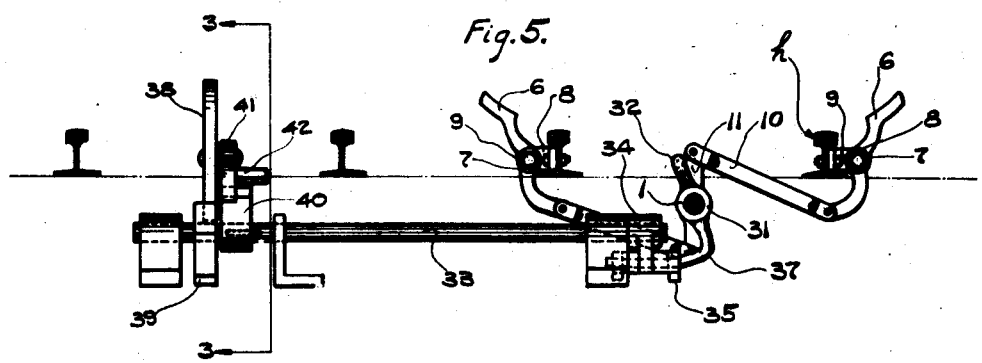
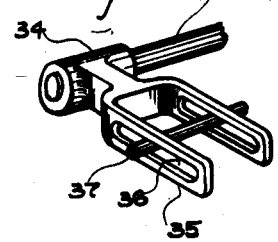
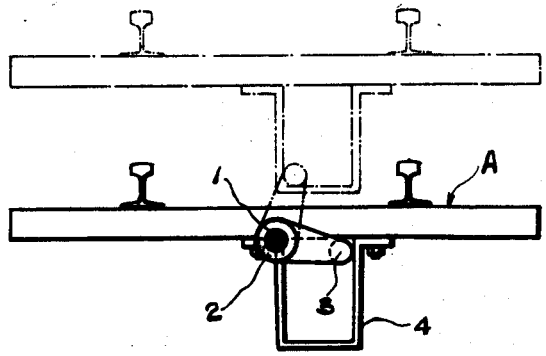
JAMES A. NOLAN. INVENTOR
BY Victor J. Evans
ATTORNEY Patented June 30, 1925.

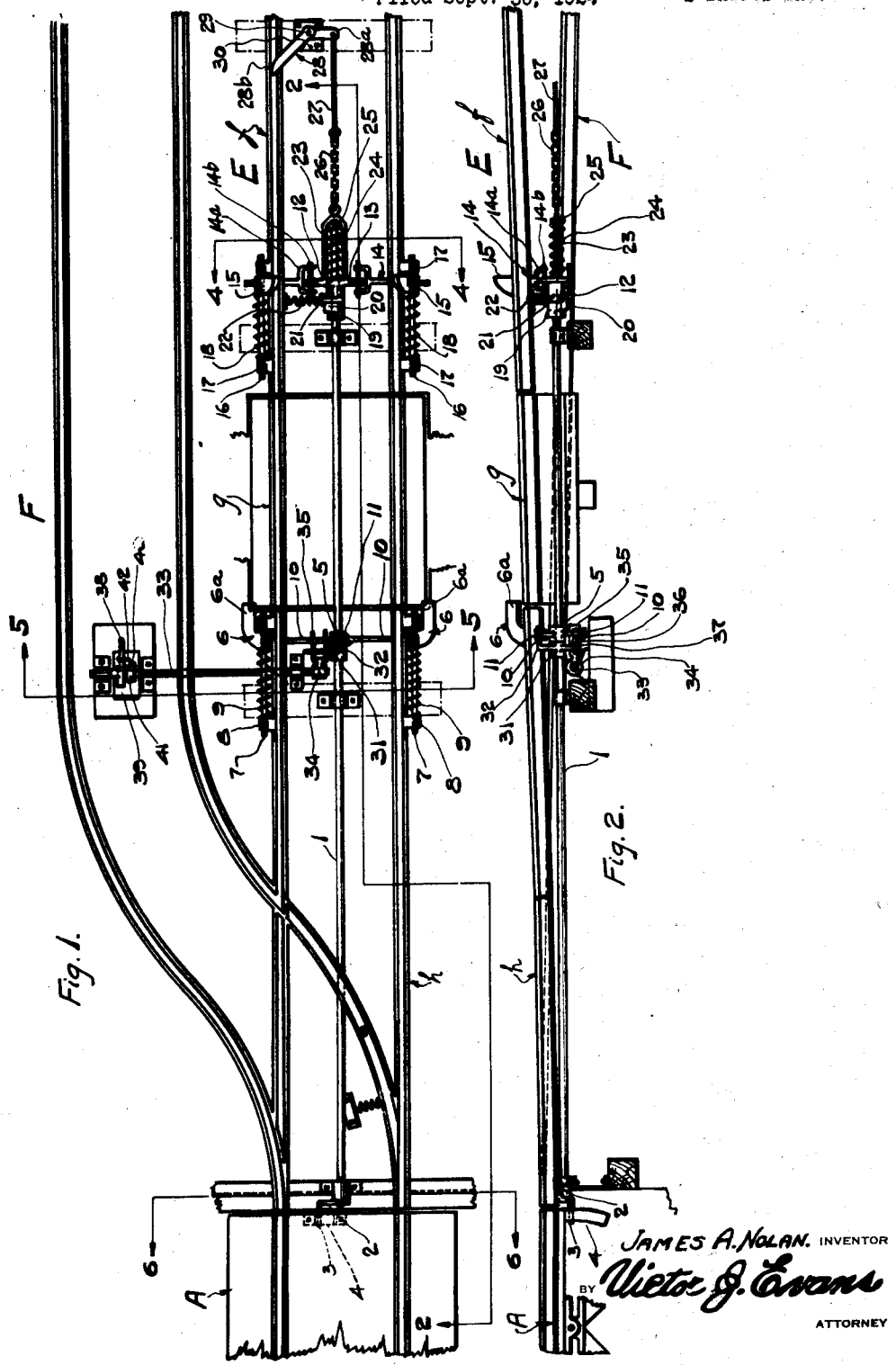

1,544,475

UNITED STATES PATENT OFFICE.

JAMES A. NOLAN, OF BOWERSTON, OHIO.

FEEDER AND SCALE FOR KICKBACK DUMPS.

Application filed September 30, 1924. Serial No. 740,828.

*To all whom it may concern:*

Be it known that I, JAMES A. NOLAN, a citizen of the United States, residing at Bowerston, in the county of Harrison and State of Ohio, have invented new and useful Improvements in Feeders and Scales for Kickback Dumps, of which the following is a specification.

This invention relates to means for handling cars of coal in mining operations, and more particularly to a feeder and scales for a kickback dump.

One of the main objects of the invention is to provide simple and efficient means whereby cars of coal can be cut out of a trip and fed onto a scales so as to be weighed, the cars after weighing being fed onto a dump or similar structure from which they are discharged and travel over an empty or receiving track, the operation being automatic. A further object is to provide an apparatus of the character stated adapted for use with a dump of the kickback type. A further object is to provide stops or holding means for holding a car on the scales section of the dump during weighing thereof, the stops or holding means being unattached to the scales section and not connected thereto in any way so as to relieve the scales section of the track from injurious strains and jars such as occur where the stops for the car are mounted on the scales section. A further object is to provide feeding means in which the cars are fed onto the scales section during the dumping operation and are fed from the scales section to the dump upon return of the dump to loading position, the means for feeding the cars onto the dump being actuated by a car traveling on the receiving track, thus ensuring speed and accuracy in operation of the feeder. Further objects will appear from the detail description.

In the drawings:—

Figure 1 is a top plan view of the apparatus;

Figure 2 is a section taken substantially on line 2—2 of Fig. 1;

Figure 3 is a section taken substantially on line 3—3 of Fig. 5;

Figure 4 is a section taken substantially on line 4—4 of Fig. 1;

Figure 5 is a section taken substantially on line 5—5 of Fig. 1;

Figure 6 is a section taken substantially on line 6—6 of Fig. 1;

Figure 7 is a detail of the counter shaft trip arm.

My apparatus is intended to be used in connection with a kickback dump A of known construction which is provided with a track section which, when the dump is in loading position, is aligned with an approach track E which is inclined downwardly toward the dump for a portion of its length. A receiving track F extends from the inner end of track E and is disposed to receive an empty car discharged from the dump upon return of the dump to loading position. The empty car travels upon the empty track F and actuates a releasing means whereby a full car is fed from the approach track onto the dump. The approach track and the dump and the empty track are all of a construction and arrangement well known in this art and need not be further described in detail. The dump may be provided with any suitable or well known means for holding the car in the dump during the dumping operation. As there are a number of apparatuses well known in this art for this purpose it is not thought necessary to illustrate or describe such apparatus in detail as this apparatus would not, in itself, cooperate with the feeder and scales forming the subject-matter of the present invention.

The approach track E is formed of an upper trip section $f$, a central scale section $g$ which is positioned above a pit for vertical movement and is connected to scales or weighing apparatus in a known manner, and a lower or inner section $h$. A rocker shaft 1 is rockably mounted centrally of track E in suitable bearings secured to the ties of the track, this shaft being held against endwise movement and being free to turn in either direction in its bearings. Shaft 1 is provided, at its inner end, with a crank arm 2 secured thereto, this arm being provided with a finger 3 which projects through a U-shaped bracket 4 secured to the underneath of dump A. When the dump is tilted into dumping position bracket 4 contacts with finger 3 and turns crank 2, and consequently shaft 1, a predetermined distance in one direction and, when the dump returns to loading position, the dump strikes finger 3 so as to depress the same and turn the shaft in the opposite direction. A sleeve 5 is loose on shaft 1 and is connected to inner horns or stops 6 which are rockably mounted on supporting bars 7 mounted through bearing blocks 8 secured to the rails of the track section $h$, stops 6 being normally held in their outer or operative position by cushion springs 9 mounted about supporting bars 7 and confined between the stops and the inner bearing blocks 8. As will be noted more clearly from Fig. 1, each stop 6 is provided with an extension 6$^a$ of such length as to project above or outwardly beyond the inner end portion of scale section $g$ of the track. The stops 6 are rockably mounted intermediate their ends and have their lower ends connected by links 10 to arms 11 projecting from sleeve 5 in such a manner that the stops will be opened when the sleeve is turned in one direction and closed when the sleeve is turned in the other direction.

Shaft 1 extends above scale section $g$ of the track but is not connected thereto so that this section has vertical movement independently of the rest of the track. A sleeve 12 is loosely mounted on shaft 1 adjacent the outer end thereof, this sleeve being mounted for turning and sliding movement on the shaft. Sleeve 12 is connected by fingers 13 and links 14 to outer trip holding stops 15 rockably mounted intermediate their ends upon bars 16 supported in bearing blocks 17 secured to the rails of track section $f$. These stops are normally held in their outer position by cushion springs 18 mounted about rods 16 and confined between the stops and the inner bearing blocks 17. A collar 19 is secured on the shaft adjacent to the inner end of sleeve 12 and is provided with an arm or cam 20 which, when the sleeve and collar are in operative relation, extends about the sleeve concentric therewith and beneath a stud 21 which projects from the sleeve and to which is secured a tension spring 22 the outer end of which is secured to the adjacent rail of section $f$ of track E. This spring acts to turn sleeve 12 in stop closing direction when the sleeve is released from arm 20.

A clevis 23 is secured to the sleeve and an expansion spring 24 is mounted about the end portion of shaft 1 within the clevis 23, this spring being confined between sleeve 12 and a collar 25 adjustably secured on the shaft by a set screw, or in any other suitable or preferred manner, to vary the compression of the spring as desired. Clevis 23 is connected by a length of chain 26 or other suitable flexible connection to one end of a link 27 the other end of which is loosely secured through arm 28$^a$ of a trip lever 28 pivoted at 29 on a supporting plate or bracket 30 secured to the adjacent rail of track section $f$, or in any other suitable or preferred manner. Outer arm 28$^b$ of trip lever 28 extends across the adjacent rail in position to be engaged by the wheel of a car traveling on track section $f$.

A collar 31 is secured on shaft 1 adjacent sleeve 5 and is provided with an operating arm 32 which extends parallel with and adjacent the sleeve. This arm is positioned to strike one of the arms 11 and turn the sleeve 5 in stop closing direction when the dump moves into dumping position. When the dump returns to loading position shaft 1 is returned to normal position with arm 32 in central or vertical position away from arm 11 of sleeve 5 so as to permit the sleeve to be turned in stop opening direction.

A counter shaft 33 is rockably mounted at right angles to shaft 1 and extends beneath section $h$ of track E and beneath the receiving track. An arm 34 is secured on the inner end of shaft 33 and is provided with a fork 35 each arm of which is provided with an elongated slot 36. These slots receive one arm of an angular trip arm 37 which depends from and is rigidly secured to sleeve 31. A trip lever 38 is mounted on the other end of shaft 33 and is disposed to be depressed by an empty car traveling on the receiving track so as to turn the shaft in proper direction to turn sleeve 5 in stop opening direction. Preferably, though not necessarily, lever 38 is mounted on shaft 33 in the manner disclosed in my patent for feeder for kickback dump, issued to me on Sept. 23, 1924, and bearing Patent Number, 1,509,374. The lever is loosely mounted on the shaft and is provided with a depending weight 39 which acts to return the lever to normal upright position, after it has been depressed and released. A ratchet block 40 is keyed on shaft 33 adjacent the lever and in position to be engaged by a pawl 41 pivoted on the lever and provided with an arm 42 disposed to contact with a pin 43 rigidly supported adjacent shaft 33. By this means, when lever 38 has been depressed sufficiently to turn shaft 33 to the required extent, pawl 41 is disengaged from block 40 releasing the shaft so as to permit it to be returned to its former or normal position. In this way, the apparatus is not rendered inoperative in the event of a car hanging on the lever, as occasionally happens, and when this car passes off of the lever it is returned to operative position and is again depressed by the following empty car. This operation is described in detail in my above identified patent and need not be further described here.

When the dump turns into dumping position the inner stops 6 are closed and the outer trip holding stops 15 are opened by means of the operating arm 20 of collar 19. This permits the front car of the trip to pass between stops 15 and travel onto scale section g of the track, on which section the car is held by the extensions 6ᵃ of stops 6 so as to permit weighing of the car. The following car of the trip operates lever 28 so as to retract clevis 23 and arm 12 pulling the stud 21 outwardly out of engagement with arm 20. This permits spring 22 to turn sleeve 12 in stop closing direction thus closing stops 15 and holding back the trip. During the dumping operation and after stops 15 have been closed, stud 21 contacts with the outer face of arm 20 which is disposed concentric with sleeve 12 and is of such length circumferentially of the sleeve as to prevent stud 21 from passing beneath arm 20. Upon return of the dump to loading position shaft 1 is turned to bring arm 32 into vertical position thus releasing sleeve 5, and collar 19 is turned so as to bring arm 20 beneath stud 21, sleeve 12 being returned to its normal operative position by spring 24 with stud 21 above arm 20. The empty car travels out of the dump onto the receiving track and depresses lever 38 turning sleeve 5 in stop opening direction and permitting the loaded car on the scales section g to pass onto the dump. When the dump again turns into dumping position stops 6 are closed and stops 15 are opened, in the manner previously described, and the front car of the trip is fed onto scale section g, the following car of the trip closing the stops 15 in the manner described. This operation is repeated continuously as long as the dump is in operation thus providing very simple and highly efficient means for automatically cutting cars out of the trip, weighing these cars and then feeding them onto the dump. As the stops 6 are closed and the trip stops are opened during the dumping operation and stops 6 are opened shortly after return of the dump to loading position, this apparatus is capable of feeding cars to the dump much faster than apparatuses now commonly in use for this purpose, thus effecting a material saving in time which is of importance in handling cars in mining operations.

To permit sliding movement of sleeve 12 on shaft 1, each of the links 14 is provided on its inner end with an elongated U-shaped head 14ᵃ in the arms of which is secured a heavy pin 14ᵇ which passes loosely through the outer end of finger 13. This connection permits the necessary sliding movement of sleeve 12 without in any way interfering with the proper operation of stops 15. This result can be accomplished by other means which would be obvious to one skilled in this art, though I ordinarily prefer to employ the means illustrated and described. As will be obvious, and as above indicated, changes in construction and arrangement of parts of the invention may be resorted to without departing from the field and scope of the same, and I intend to include all such variations as fall within the scope of the appended claims, in this application in which a preferred form only of my invention is disclosed.

What I claim is:—

1. In car handling means, in combination with a dump and an approach track leading to the dump and a receiving track leading from said dump, inner stops on the approach track adjacent the dump, outer trip holding stops on the approach track remote from said inner stops, means for closing the inner stops and opening the outer stops as the dump moves into dumping position, means for closing the outer stops after a car has passed between the same independently of the inner stops, the means for opening the outer stops being moved into operative position and the means for closing the inner stops being moved into vertical position to permit opening of said inner stops upon return of the dump to loading position, and means actuated by a car traveling on the receiving track for opening said inner stops.

2. In car handling means, in combination with a kick-back dump and an approach track leading to the dump and a receiving track leading from said dump, inner stops on the approach track adjacent the dump, outer trip holding stops on the approach track remote from said inner stops, means for closing the inner stops and opening the outer stops as the dump moves into dumping position, means for closing the outer stops after a car has passed between the same independently of the inner stops, the means for opening the outer stops being moved into operative position and the means for closing the inner stops being moved into vertical position to permit opening of said inner stops upon return of the dump to loading position, and means actuated by a car traveling on the receiving track for opening said inner stops.

3. In car handling means, in combination with a kickback dump and an approach track leading to the dump and a receiving track leading from said dump, a rocker shaft on the approach track, an inner sleeve and an outer sleeve loose on said shaft, inner stops and outer stops on the approach track, connections between the respective sleeves and stops for closing and opening the latter in accordance with turning of the former, the sleeves and the shaft being provided with cooperating means for turning the inner sleeve in stop closing direction and the outer sleeve in stop opening direction when the shaft is turned in one direction, means for turning the shaft in said direction when the dump moves into dumping position and for returning the shaft to its first position when the dump returns to loading position, means for turning the outer sleeve in stop closing direction independently of the shaft when a car has passed between the outer stops, and means actuated by a car traveling on the receiving track for turning the inner sleeve in stop opening direction independently of the shaft.

4. In car handling means, in combination with a kickback dump and an approach track leading to the dump and a receiving track leading from said dump, a rocker shaft on the approach track, inner stops and outer stops on the approach track, means for closing the inner stops and opening the outer stops when the shaft is turned in one direction, means closing the outer stops independently of the shaft after a car has passed between said outer stops, means actuated by a car traveling on the receiving track for opening the inner stops independently of the shaft, and means for turning the shaft in said direction when the dump moves into dumping position and for returning the shaft to its original position when the dump returns to loading position.

5. In car handling means, in combination with a kickback dump and an approach track leading to the dump and a receiving track leading from said dump, a rocker shaft on the approach track, a sleeve loose on the shaft, inner stops on the track, connections between the sleeve and the stops for closing and opening the stops in accordance with turning of the sleeve, an arm secured on the shaft adjacent the sleeve and extending in the direction thereof, said sleeve being provided with an element extending across the arm in the path of movement thereof when the stops are open, outer stops on the approach track, means for connecting the outer stops to the shaft so as to be opened thereby when said shaft is turned in inner stop closing direction, means for turning the shaft in proper direction to bring said arm into contact with the element of the sleeve and turn the latter in stop closing direction when the dump moves into dumping position and for returning the shaft to its first position when the dump returns to loading position, means for releasing the outer stops from the shaft and closing them independently of said shaft after a car has passed between the same and for establishing operating connections between the shaft and the outer stops when said shaft is returned to its first position, and means actuated by a car traveling on the receiving track for turning the sleeve in stop opening direction independently of the shaft.

6. In car handling means, in combination with a kickback dump and an approach track leading to the dump and a receiving track leading from said dump, a rocker shaft on the approach track, a sleeve loose on the shaft, inner stops on the track, connections between the sleeve and the stops for closing and opening the stops in accordance with turning of the sleeve, a collar secured on the shaft adjacent said sleeve and provided with an operating arm extending in the direction of the sleeve, the sleeve having an element extending across the path of movement of said operating arm when the stops are open and being provided with a depending trip arm, a counter shaft, a trip lever mounted on the shaft and positioned on the receiving track to be operated by a car traveling thereon, said lever being connected to the counter shaft for turning it in stop opening direction, means for turning said rocker shaft in stop closing direction when the dump moves into dumping position and for returning the rocker shaft to normal position when said dump returns to loading position, outer stops on the approach track beyond the inner stops, means for connecting the outer stops to the rocker shaft so as to be opened thereby when said rocker shaft is turned in inner stop closing direction, and means for releasing the outer stops from the rocker shaft and closing them after a car has passed between said outer stops and for re-establishing operating connections between the outer stops and the rocker shaft when the rocker shaft is returned to normal position.

7. In car handling means, in combination with a kickback dump and an approach track leading to the dump and a receiving track leading from said dump, inner stops on the approach track, outer stops on the approach track beyond the inner stops, a rock shaft on the approach track, means for closing the inner stops when the shaft is turned in one direction and for releasing said inner stops to permit opening thereof when said shaft is turned in the other direction, means for turning the shaft in inner stop closing direction when the dump moves into loading position and for turning said shaft in inner stop releasing direction when the dump returns to loading position, means actuated by a car traveling on the receiving track for opening the inner stops independently of the shaft, means for connecting the outer stops to the shaft in opposite relation to the inner stops when said shaft is in inner stop releasing position, and means for releasing the outer stops from the shaft and closing them after a car has passed between the outer stops and for reestablishing operating connections between said outer stops and the shaft when said shaft is returned to inner stop releasing position.

8. In car handling means, in combination with a kickback dump and an approach track leading to the dump and a receiving track leading from said dump, inner stops on the approach track, outer stops on the approach track beyond the inner stops, a rock shaft on the approach track, means for closing the inner stops when the shaft is turned in one direction and for releasing said inner stops to permit opening thereof when said shaft is turned in the other direction, means for turning the shaft in inner stop closing direction when the dump moves into loading position and for turning said shaft in inner stop releasing direction when the dump returns to loading position, means actuated by a car traveling on the receiving track for opening the inner stops independently of the shaft, a sleeve loosely and slidably mounted on the shaft, connections between the sleeve and the outer stops for opening and closing the latter in accordance with turning of the former, a collar secured on the shaft adjacent the sleeve and provided with an arm projecting in the direction of and extending about said sleeve, the sleeve being provided with an element extending above and across the arm when the shaft is in inner stop releasing position and the outer stops are closed, means urging the outer stops in closing direction, means urging the sleeve toward said arm, and means for moving the sleeve away from the arm and disengaging it therefrom after a car has passed between the outer stops, the width of said arm circumferentially of the sleeve being greater than the distance through which the shaft is turned in inner stop closing direction.

9. In car handling means, in combination with a kickback dump and an approach track leading thereto and a receiving track leading from the dump, said approach track including a relatively movable scales section, stops on the approach track and unconnected to the scales section thereof, said stops when closed extending inwardly of the scales section in position to hold a car thereon, means for closing said stops and for feeding cars onto the scales section of the approach track when the dump moves into dumping position and for releasing the stops to permit opening thereof when the dump returns to loading position, and means actuated by a car traveling on the receiving track for opening the stops.

10. In car handling means, in combination with a kickback dump and an approach track leading thereto and a receiving track leading from the dump, said approach track including a relatively movable scales section, inner stops on the approach track and unconnected to the scales section thereof, said stops when closed extending inwardly over the inner end of the scales section, outer stops on the approach track beyond said scales section, means for closing the inner stops and opening the outer stops when the dump moves into dumping position and for releasing the inner stops to permit closing thereof when the dump returns to loading position, means for closing the outer stops independently of the inner stops when a car has passed between said outer stops, and means actuated by a car traveling on the receiving track for opening the inner stops independently of the outer stops.

In testimony whereof I affix my signature.

JAMES A. NOLAN.